United States Patent
Otsuka et al.

(10) Patent No.: US 12,035,042 B2
(45) Date of Patent: Jul. 9, 2024

(54) COMMUNICATION CONTROL DEVICE AND IMAGING APPARATUS

(71) Applicant: Panasonic Intellectual Property Management Co., Ltd., Osaka (JP)

(72) Inventors: Koichi Otsuka, Osaka (JP); Wataru Okamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 120 days.

(21) Appl. No.: 17/993,000

(22) Filed: Nov. 23, 2022

(65) Prior Publication Data
US 2023/0171487 A1 Jun. 1, 2023

(30) Foreign Application Priority Data

Nov. 29, 2021 (JP) ................................. 2021-193489

(51) Int. Cl.
*H04N 23/66* (2023.01)
*H04N 23/62* (2023.01)

(52) U.S. Cl.
CPC ............. *H04N 23/66* (2023.01); *H04N 23/62* (2023.01)

(58) Field of Classification Search
CPC ....... H04N 23/667; H04N 23/62; H04N 23/66
USPC .................................................. 348/211.11
See application file for complete search history.

(56) References Cited

U.S. PATENT DOCUMENTS

| 6,742,055 | B2* | 5/2004 | Matsunaga | G06F 13/385 |
| | | | | 713/1 |
| 7,788,425 | B2* | 8/2010 | Ikemoto | G06F 21/57 |
| | | | | 710/36 |
| 8,612,653 | B2* | 12/2013 | Nitta | H04N 21/485 |
| | | | | 710/74 |
| 8,862,789 | B2* | 10/2014 | Hirata | G06F 15/177 |
| | | | | 710/10 |
| 8,892,072 | B2* | 11/2014 | Mun | H04M 1/72403 |
| | | | | 455/410 |
| 9,158,721 | B2* | 10/2015 | Suwabe | G06F 13/385 |
| 9,170,622 | B2* | 10/2015 | Nakagai | G06F 1/266 |
| 10,178,134 | B2* | 1/2019 | Sato | H04L 63/20 |
| 10,530,737 | B2* | 1/2020 | Cho | H04L 67/75 |

(Continued)

FOREIGN PATENT DOCUMENTS

| JP | 2001-265706 A | 9/2001 |
| JP | 2002-314863 A | 10/2002 |

(Continued)

*Primary Examiner* — Pritham D Prabhakher
(74) *Attorney, Agent, or Firm* — Renner, Otto, Boisselle & Sklar, LLP (57) ABSTRACT

A communication control device for communicating data with an external device, the communication control device includes: a communication interface that connects with the external device according to a predetermined communication standard; a controller that controls a plurality of host functions in which the communication control device performs each operation as a host for the external device in data communication via the communication interface; and a user interface that sets an on/off state for each of the host functions, based on a user operation, wherein among the plurality of host functions, according to a host function in the on state, the controller controls the user interface to restrict a host function for changing setting thereof based on the user operation.

9 Claims, 9 Drawing Sheets (56) References Cited

U.S. PATENT DOCUMENTS

| | | | |
|---|---|---|---|
| 11,073,881 B2* | 7/2021 | Koshigaya | G06F 1/28 |
| 2001/0027500 A1 | 10/2001 | Matsunaga | |
| 2002/0154224 A1 | 10/2002 | Yoneda | |
| 2007/0037050 A1* | 2/2007 | Rigobert | H01M 50/213 |
| | | | 165/83 |
| 2007/0162949 A1 | 7/2007 | Nitta et al. | |
| 2008/0037050 A1* | 2/2008 | Sasaki | G06F 13/102 |
| | | | 358/1.15 |
| 2010/0211963 A1 | 8/2010 | Suwabe | |
| 2011/0018344 A1* | 1/2011 | Liao | G06F 1/266 |
| | | | 307/31 |
| 2013/0078951 A1* | 3/2013 | Mun | H04L 63/083 |
| | | | 455/566 |
| 2014/0129856 A1* | 5/2014 | Bertin | G06F 1/266 |
| | | | 713/320 |
| 2015/0067610 A1* | 3/2015 | Tokunaga | G06F 3/0482 |
| | | | 715/841 |
| 2015/0133085 A1* | 5/2015 | Mun | H04M 1/67 |
| | | | 455/411 |
| 2017/0272398 A1* | 9/2017 | Cho | H04L 67/75 |
| 2017/0339195 A1* | 11/2017 | Sato | H04L 63/20 |
| 2019/0227609 A1 | 7/2019 | Koshigaya | |
| 2021/0349511 A1* | 11/2021 | Moritomo | G06F 13/4282 |

FOREIGN PATENT DOCUMENTS

| | | |
|---|---|---|
| JP | 2007-180764 A | 7/2007 |
| JP | 2010-191717 A | 9/2010 |
| JP | 2019-128761 A | 8/2019 |

* cited by examiner

COMMUNICATION CONTROL DEVICE AND IMAGING APPARATUS

BACKGROUND

1. Technical Field

The present disclosure relates to a communication control device that is connected to an external device and performs data communication, and an imaging apparatus including the communication control device.

2. Related Art

JP 2001-265706 A discloses a technology for implementing a plug and play function, which is a feature of a universal serial bus (USB), without intervention of an operator in a peripheral interface of a personal computer (PC). A USB device controller as a USB controller chip in JP 2001-265706 A selects a predetermined number of functions from among a plurality of functions on the basis of order information stored in a RAM, configures functions within the number that can be supported by the controller as endpoints corresponding to the USB, and reports the configuration to the PC that is a host device. In JP 2001-265706 A, when the number of endpoints supported by the USB device controller is insufficient, endpoints that are not used at the same time are dynamically reconfigured, thereby reducing cost of hardware for the above-described technology without operator intervention.

SUMMARY

The present disclosure provides a communication control device and an imaging apparatus capable of facilitating use of a function in which the communication control device serves as a host in data communication with an external device.

The present disclosure provides a communication control device for performing data communication with an external device. The communication control device includes: a communication interface that connects with the external device according to a predetermined communication standard; a controller that controls a plurality of host functions in which the communication control device performs each operation as a host for the external device in data communication via the communication interface; and a user interface that sets an on/off state of each of the host functions, based on a user operation. Among the plurality of host functions, according to a host function in the on state, the controller controls the user interface to restrict a host function for changing setting thereof based on the user operation.

An imaging apparatus according to the present disclosure includes the communication control device and an image sensor that captures a subject image to generate image data. In the imaging apparatus, a plurality of host functions includes at least one function of a function group including a function to record the image data from the imaging apparatus to the external device via the communication interface, a function to stream the image data using the external device, and a function to acquire a control signal for controlling an operation of the imaging apparatus from the external device.

According to the communication control device and the imaging apparatus of the present disclosure, it is possible to facilitate use of a function in which the communication control device serves as a host in data communication with an external device.

DETAILED DESCRIPTION

Embodiments will hereinafter be described in detail with reference to the drawings as appropriate. Note that excessively detailed descriptions may be omitted. For example, detailed descriptions of well-known matters and repeated explanation on substantially the same configuration may be omitted. These omissions are made to avoid unnecessary redundancy of the following description, and to help easy understanding by those skilled in the art. The inventor provides the accompanying drawings and the following description to help those skilled in the art sufficiently understand the present disclosure. The drawings and description are therefore not intended to limit the subject matters claimed in the appended claims.

First Embodiment

In a first embodiment, a digital camera as an example of an imaging apparatus including a communication control device according to the present disclosure will be described.

1. Configuration

A configuration of the digital camera according to the first embodiment will be described with reference to FIG. 1.

Figure 1:
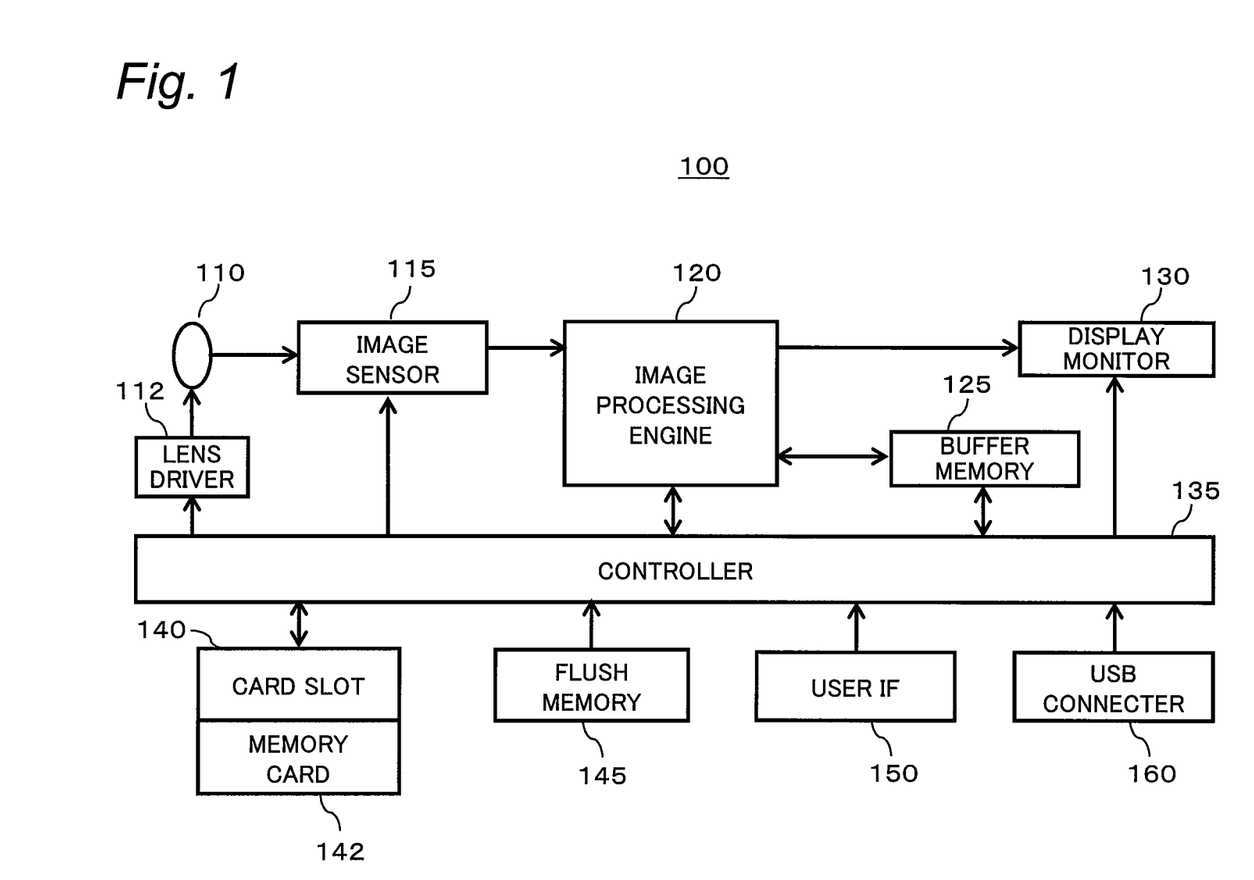
FIG. 1 is a diagram showing a configuration of a digital camera according to a first embodiment of the present disclosure.

FIG. 1 is a diagram showing a configuration of a digital camera 100 according to the present embodiment. The digital camera 100 of the present embodiment includes an image sensor 115, an image processing engine 120, a display monitor 130, and a controller 135. The digital camera 100 further includes a buffer memory 125, a card slot 140, a flash memory 145, a user interface 150, and a USB connector 160.

The digital camera 100 further includes an optical system 110 and a lens driver 112, for example. The optical system 110 and the lens driver 112 may constitute an interchangeable lens which is detachable from a body of the digital camera 100.

The optical system 110 includes a focus lens, a zoom lens, an optical image stabilization lens (OIS), an aperture, a shutter, and the like. The focus lens is a lens for changing a focus state of a subject image formed on the image sensor 115. The zoom lens is a lens for changing a magnification of a subject image formed by the optical system. Each of the focus lens and the like is constituted by one or more lenses.

The lens driver 112 drives the focus lens and the like of the optical system 110. The lens driver 112 includes a motor, and moves the focus lens along an optical axis of the optical system 110 under control by the controller 135. A configuration of the lens driver 112 for driving the focus lens may be implemented by a DC motor, a stepping motor, a servo motor, an ultrasonic motor, or the like.

The image sensor 115 captures a subject image formed via the optical system 110, to generate imaging data. The imaging data constitutes image data indicating an image captured by the image sensor 115. The image sensor 115 generates image data indicating a new frame at a predetermined frame rate (e.g., 30 frames/second). Generating timing of imaging data and an electronic shutter operation of the image sensor 115 are controlled by the controller 135. The image sensor 115 may be constituted by a CMOS image sensor, a CCD image sensor, an NMOS image sensor, or other various image sensors.

The image sensor 115 performs an imaging operation for capturing a still image, an imaging operation for capturing a through image, and the like. The through image is mainly constituted by a moving image, and is displayed on the display monitor 130 to allow a user to determine a composition for capturing a still image. Each of the through image and the still image is an example of a captured image according to the present embodiment. The image sensor 115 is an example of an imager according to the present embodiment.

The image processing engine 120 performs various processes on the imaging data output from the image sensor 115 to generate image data, and performs various processes on the image data to generate an image to be displayed on the display monitor 130. The various processes include, but are not limited to, white balance correction, gamma correction, YC conversion processing, electronic zoom processing, compression processing, decompression processing, and the like. The image processing engine 120 may be constituted by a hard-wired electronic circuit, or may be constituted by a microcomputer, a processor, or the like using a program.

The display monitor 130 is an example of a display which displays various information. For example, the display monitor 130 displays an image (through image) indicated by image data captured by the image sensor 115 and subjected to image processing by the image processing engine 120. The display monitor 130 further displays a menu screen or the like through which the user makes various settings for the digital camera 100. For example, the display monitor 130 may be constituted by a liquid crystal display device or an organic EL device.

The user interface 150 is a general term expressing a user interface which receives an operation (instruction) from the user. For example, the user interface 150 includes physical components such as a button, a lever, a dial, a touch panel, and a switch. The user interface 150 also includes virtual components such as a button and an icon displayed on the display monitor 130. A specific example of the user interface 150 will be described later.

The controller 135 integratedly controls an overall operation of the digital camera 100. The controller 135 includes a CPU and the like, and implements predetermined functions under a program (software) executed by the CPU. Instead of the CPU, the controller 135 may include a processor constituted by a dedicated electronic circuit designed to implement the predetermined functions. Accordingly, the controller 135 may be implemented by a CPU, an MPU, a GPU, a DSU, an FPGA, an ASIC, or other various processors. The controller 135 may be constituted by one or a plurality of processors. In addition, the controller 135 may be configured by one semiconductor chip together with the image processing engine 120 or the like.

The buffer memory 125 is a recording medium which functions as a work memory for the image processing engine 120 and the controller 135. The buffer memory 125 is implemented by a dynamic random access memory (DRAM) or the like. The flash memory 145 is a non-volatile recording medium. For example, the flash memory 145 stores various data structures (described below) for managing operation modes of the digital camera 100 according to the present embodiment. Each of the memories 145 and 125 is an example of a memory of the present embodiment.

The card slot 140 is a means into which a detachable memory card 142 is inserted. The card slot 140 is capable of electrically and mechanically connecting the memory card 142. The memory card 142 is an external memory inside of which a recording element such as a flash memory is equipped. The memory card 142 is capable of storing data such as image data generated by the image processing engine 120.

The USB connector 160 is an interface module (circuit) connected with another device via a USB cable. The controller 135 can transmit and receive various data to and from the other device by data communication conforming to a USB standard via the USB connector 160. The USB connector 160 is an example of a communication interface in the present embodiment. In the present embodiment, a case where the number of USB connectors 160 of the digital camera 100 is one will be described.

In the digital camera 100 configured as described above, the communication control device is configured integrally with the digital camera 100 as the imaging apparatus, and includes, for example, the USB connector 160, the controller 135, and the user interface 150. The communication control device may include the display monitor 130 as an example of an annunciator.

1-1. User Interface

Figure 2:
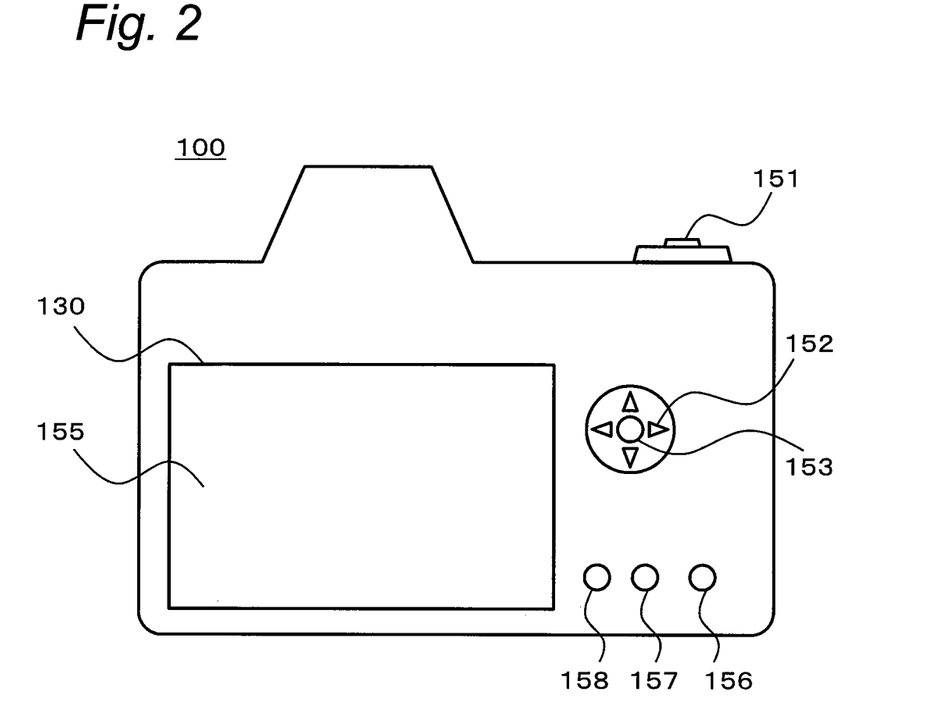
FIG. 2 is a diagram showing a rear of the digital camera.

A specific example of the user interface 150 will be described with reference to FIG. 2. FIG. 2 is a diagram showing a rear of the digital camera 100.

FIG. 2 shows an example of the user interface 150 which includes a release button 151, a selection button 152, a decision button 153, a touch panel 155, and a plurality of function buttons 156, 157, and 158. When receiving an operation from the user, the user interface 150 transmits various instruction signals to the controller 135.

The release button 151 is a two-stage press-type button. When the release button 151 is half-pressed by the user, the controller 135 executes auto focus control (AF control), auto exposure control (AE control), and the like. When the release button 151 is fully pressed by the user, the controller 135 records image data captured at the timing of the pressing operation as a recorded image in the memory card 142 or the like.

The selection button 152 is a press-type button provided in the up, down, left, and right directions. The user can select various condition items displayed on the display monitor 130 or move a cursor by pressing the selection button 152 in one of the up, down, left, and right directions.

The decision button 153 is a press-type button. When the user presses the decision button 153 in an imaging mode or a playback mode of the digital camera 100, the controller 135 displays a menu screen on the display monitor 130. The menu screen is a screen via which various conditions for imaging or playback are set. When the decision button 153 is pressed with a setting item of any one of the various conditions being selected, the controller 135 decides the setting of the selected item.

The touch panel 155 is superimposed on the display screen of the display monitor 130, and detects a touch operation on the display screen by a finger of the user. In this manner, the user is allowed to perform operations such as designation of a region of an image displayed on the display monitor 130, and various selections on the menu screen.

Each of the function buttons 156 to 158 is a press-type button to which a specific function of the digital camera 100 is allocated in advance.

1-2. Menu Configuration of USB Function

The digital camera 100 of the present embodiment has a plurality of USB functions each being a function to perform a predetermined operation by data communication with various external devices connected via the USB connector 160. A configuration of a setting menu for setting various USB functions of the digital camera 100 will be described with reference to FIGS. 3A to 3D.

FIGS. 3A to 3D each show a configuration example of a setting menu of USB functions F1 to F7 of the digital camera 100. The digital camera 100 in the present embodiment has a plurality of USB host functions F1 to F4 and a plurality of USB device functions F5 to F7. The USB host functions F1 to F4 are USB functions implemented with the digital camera 100 functioning as a host between a host and a device in USB standard data communication. The USB device functions F5 to F7 are USB functions implemented with the digital camera 100 functioning as a device.

Figure 3A:
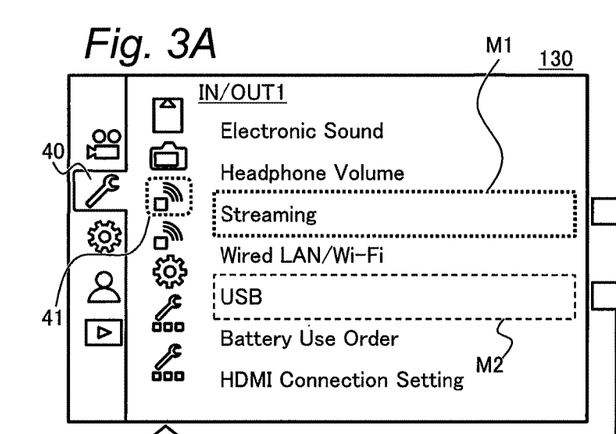
FIGS. 3A to 3D are diagrams each showing a configuration example of a setting menu of USB functions of the digital camera.

FIG. 3A shows a display example of a setting menu of the digital camera 100. This example shows a case where a specific sub tab 41 in a setting tab 40 related to various settings of the digital camera 100 is selected on the menu screen displayed on the display monitor 130. The setting tab 40 classifies menu items for various settings for each of the sub tabs 41 indicating various categories.

In the present embodiment, in the setting menu segmented finely according to the category of the function used by the user in the digital camera 100, each of the USB host functions F1 to F4 is arranged in the category according to each function. The digital camera 100 in the present embodiment is configured to enable to set availability/unavailability, that is, an on/off state of each of the USB host functions F1 to F4 in the setting menu. Each of the USB host functions F1 to F4 is an example of the host function in the present embodiment.

The sub tab 41 in the example of FIG. 3A indicates a category related to input and output of the digital camera 100, and includes menu items M1 and M2 such as "streaming" and "USB", for example. Each of the menu items M1 and M2 can be selected by the selection button 152, for example. A user operation of a setting change can be input by operating the decision button 153. The same operations can be performed by a touch operation or the like of the touch panel 155.

Figure 3B:
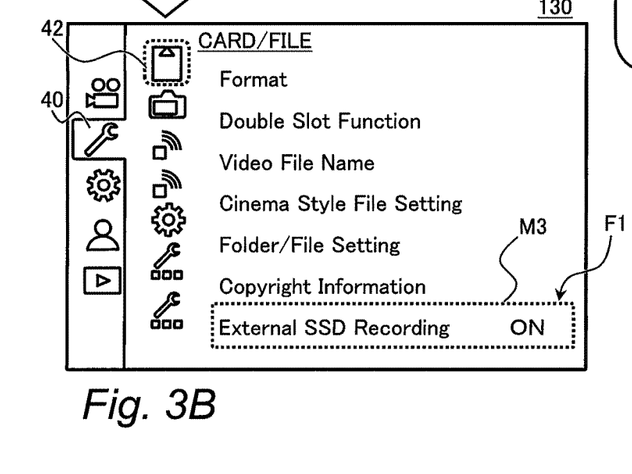

FIG. 3B shows a display example when a sub tab 42 different from that in FIG. 3A is selected. The sub tab 42 in the example of FIG. 3B includes menu items of categories related to a storage medium such as the memory card 142 and a file to be recorded. For example, a menu item M3 of "external SSD recording" sets an on/off state of an external recording function F1 which is the USB host function. When an external storage device such as an SSD drive is connected to the USB connector 160, the external recording function F1 enables an operation of recording moving image data or the like by the digital camera 100 in the external storage device.

Figure 3C:
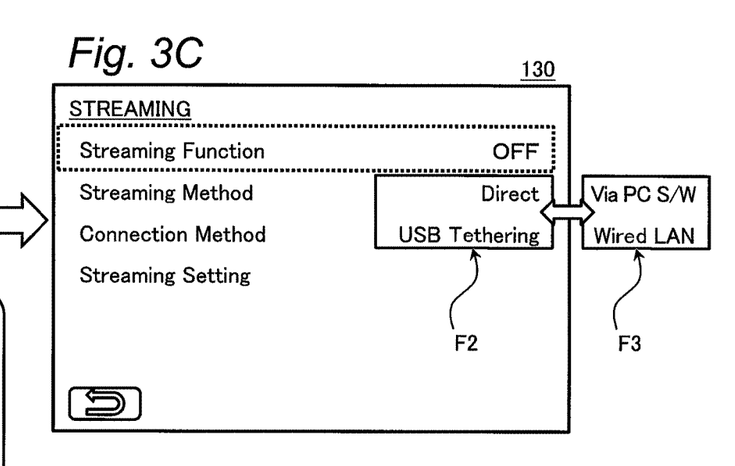

FIG. 3C shows a display example when the menu item M1 of FIG. 3A is selected. In the present example, the menu item M1 manages first and second streaming functions F2 and F3 which are the USB host functions.

As shown in FIG. 3C, a detailed screen of the menu item M1 includes an item for collectively setting on/off states of the various streaming functions F2 and F3, an item for switching the various streaming functions F2 and F3 as options by setting a streaming method and a connection method, and the like. Each of the streaming functions F2 and F3 enables the digital camera 100 to perform an operation to communicate data with an external device by each connection method in order to perform streaming distribution for streaming moving image data or the like of the digital camera 100 via a communication network such as the Internet.

In the first streaming function F2, the moving image data output from the digital camera 100 has a data format in which streaming distribution can be performed according to a streaming method "direct". For example, a protocol of this function F2 is RTMP/RTMPS. Furthermore, in this function F2, the USB connector 160 of the digital camera 100 and an information terminal such as a smartphone are connected with each other via a USB cable according to a connection method "USB tethering".

In the second streaming function F3, according to a streaming method "via PC software", the moving image data output from the digital camera 100 has a data format that can be edited by software for streaming distribution in an external information terminal. For example, a protocol of this function F3 is RTP/RTSP. Further, in this function F3, according to a connection method "wired LAN", the USB connector 160 is connected to an information terminal such as a PC via a USB-wired LAN conversion adapter (hereinafter referred to as "wired LAN adapter"). In such connection, a hub or the like may be further used, and the plurality of digital cameras 100 can be connected to a common information terminal via the hub.

Figure 3D:
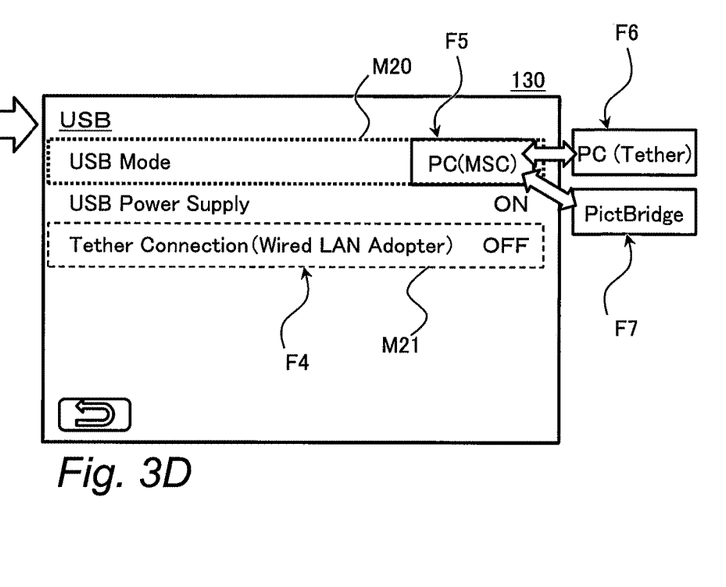

FIG. 3D shows a display example when the menu item M2 different from that of FIG. 3C is selected in the menu item of FIG. 3A. A detailed screen of the menu item M2 includes menu items M20 and M21 such as "USB mode" and "tether connection (wired LAN adapter)".

The menu item M20 sets different modes "PC (MSC)", "PC (tether)", and "PictBridge" corresponding to the plurality of USB device functions F5, F6, and F7, respectively, as alternative options. Each of the functions F5 to F7 corresponds to a separate USB device class, for example. As described above, in the present example, the USB device functions F5 to F7 are arranged at one place in the setting menu, and one of the USB device functions F5 to F7 can be set to an on state in a selective format. Each of the USB device functions F5 to F7 is an example of the device function in the present embodiment.

The menu item M21 sets an on/off state of a tether connection function F4 which is the USB host function. The tether connection function F4 can execute an operation for functioning tether connection in which the information terminal controls an image-shooting operation and the like of the digital camera 100 in a connection method similar to the streaming function F3 of the connection method "wired LAN" described above, for example. For example, in the present function F4, the USB connector 160 of the digital camera 100 acquires a control signal from the information terminal via the wired LAN adapter.

In the setting menu configured as described above, the USB host functions F1 to F4 are individually managed at various places in the finely segmented setting menu. Accordingly, the user can complete setting of the desired function on the menu screen of the category of the function desired to be used, without particularly taking care of whether the digital camera 100 functions as the host. Thus, the user can easily utilize the digital camera 100.

2. Operation

Hereinafter, an operation of the digital camera 100 configured as described above will be described.

When any of the USB host functions F1 to F4 described above is turned on, the digital camera 100 according to the present embodiment shifts to an operation mode in which the digital camera functions as a host (hereinafter referred to as a "host mode"). At this time, the digital camera 100 performs an advanced operation such as initiatively controlling data communication as the host with respect to an external device. Then, various loads are concerned for the digital camera 100.

For example, during execution of any of the USB host functions F1 to F4, it is difficult for the one USB connector 160 to simultaneously execute the other USB functions. Furthermore, in the on state of each of the USB host functions F1 to F4, a function that cannot be executed in the digital camera 100 may occur in addition to the other USB functions. In the host mode digital camera 100, power consumption may increase due to power supply to the external device connected to the USB connector 160 or the like.

In view of the above, a useful method for utilizing the digital camera 100 is considered as selectively turning on the plurality of USB host functions F1 to F4 when the user wants to use a desired function and turning them off otherwise. To this end, the digital camera 100 of the present embodiment performs control to restrict the USB host functions F1 to F4 to be turned on to one.

A typical method in the function restriction as described above is considered as in an exemplary state where one USB host function (the former) is turned on in advance, the user operation to turn on another USB host function (the latter) results in that only one of the former and the latter is turned on according to whether the former or the latter uniformly. However, in such an exemplary system in which only the former is turned on, when the latter is a main function from a predetermined viewpoint such as image-shooting/recording, the user cannot turn on the main latter due to the on state of the former which is not the main function.

On the other hand, in another system in which only the latter is turned on, when the former is a main function, the main former is turned off due to turning on the latter which is not the main function. Furthermore, this system has no particular opportunity for the user to turn off the USB host function. Thus, the difficulty is concerned for canceling the host mode in the digital camera.

Figure 4:
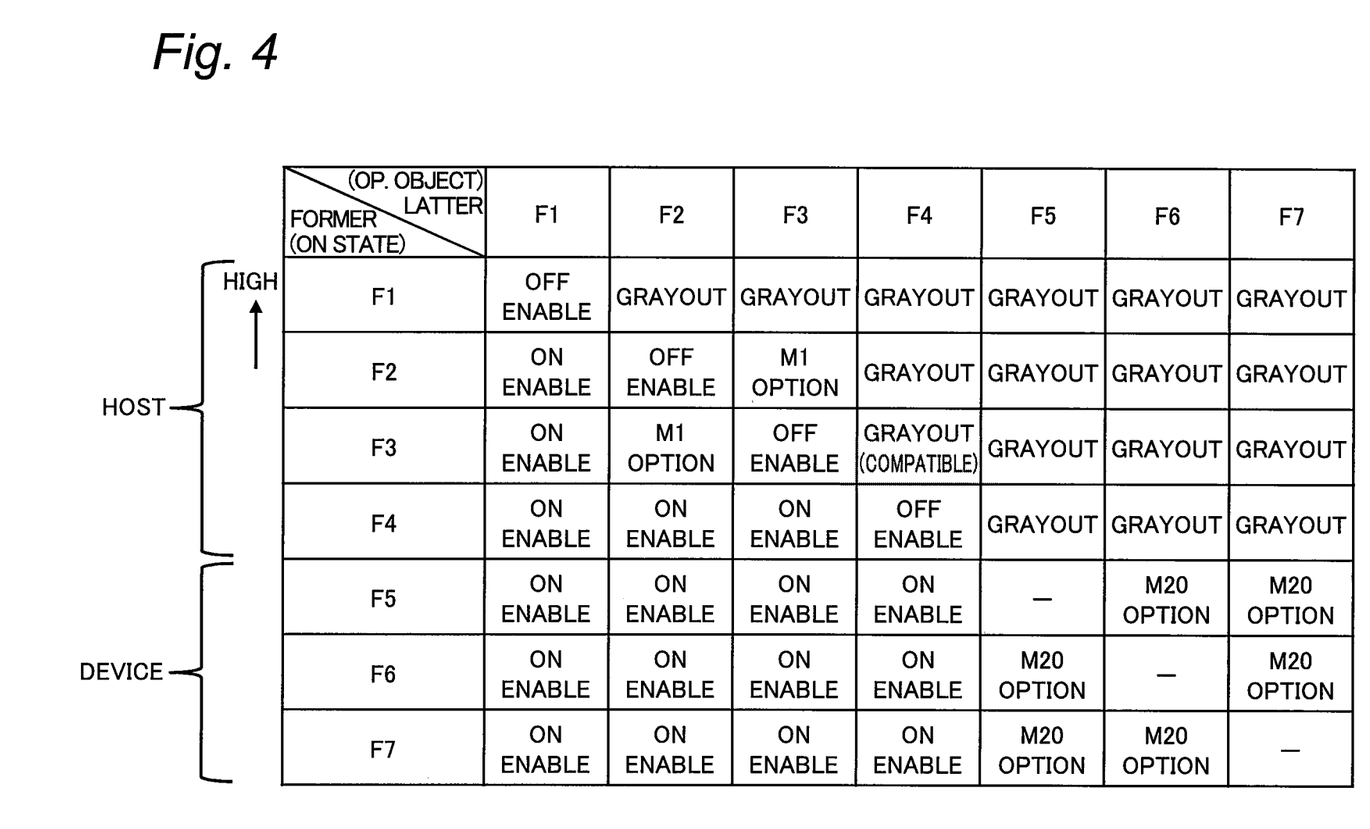
FIG. 4 is a diagram showing priority order among the USB functions of the digital camera.

Therefore, the digital camera 100 of the present embodiment uses a rank relation of a priority order for function restriction, the priority order relation being predefined such as which of the plurality of USB functions F1 to F7 is prioritized. FIG. 4 is a diagram showing the priority order among the USB functions F1 to F7 in the digital camera 100 according to the present embodiment. In the table in FIG. 4, each row shows the USB functions F1 to F7 in an on state before a setting change by a user operation (i.e., the former), and each column shows the USB functions F1 to F7 of the operation object (i.e., the latter).

FIG. 4 shows an example in which the rank is defined that the USB host functions F1 to F4 are arranged in order from the top of the priority order and the USB device functions F5 to F7 are arranged lower than the USB host functions. In this example, the USB device functions F5 to F7 have the same order. Some of the USB host functions F1 to F4 may have the same order (e.g., F2 and F3). In addition, the priority order among the USB functions F1 to F7 is not particularly limited to the shown order, and may be various orders.

When any one of the USB host functions F1 to F4 is in the on state, the digital camera 100 in the present embodiment sets the USB function lower than the USB host function in the on state to a grayout state, as exemplified in FIG. 4. The grayout state is a state in which a setting change by a user operation is prohibited, with a corresponding menu item being displayed in grayout, for example.

On the other hand, the setting change of the USB function higher than the USB host function in the on state is not prohibited, and then setting of an on/off state can be changed by the user operation. A row in FIG. 4 correspond to a state of the digital camera 100 before and after the user operation of the setting change is input.

As described above, the digital camera 100 according to the present embodiment provides a rank such as priority order among the plurality of USB functions F1 to F7, to control a setting state of each of the USB functions F1 to F7 and a possibility of change by the user operation such that the higher USB function is prioritized over the lower USB function. According to this, when the user desires to use a USB function higher than the USB function in the on state, the user can set a desired function to an on state by performing a user operation of a setting change, for example. It is possible to avoid a situation in which the higher USB function is turned off due to the lower USB function.

2-1. Menu Setting Operation

Figure 5:
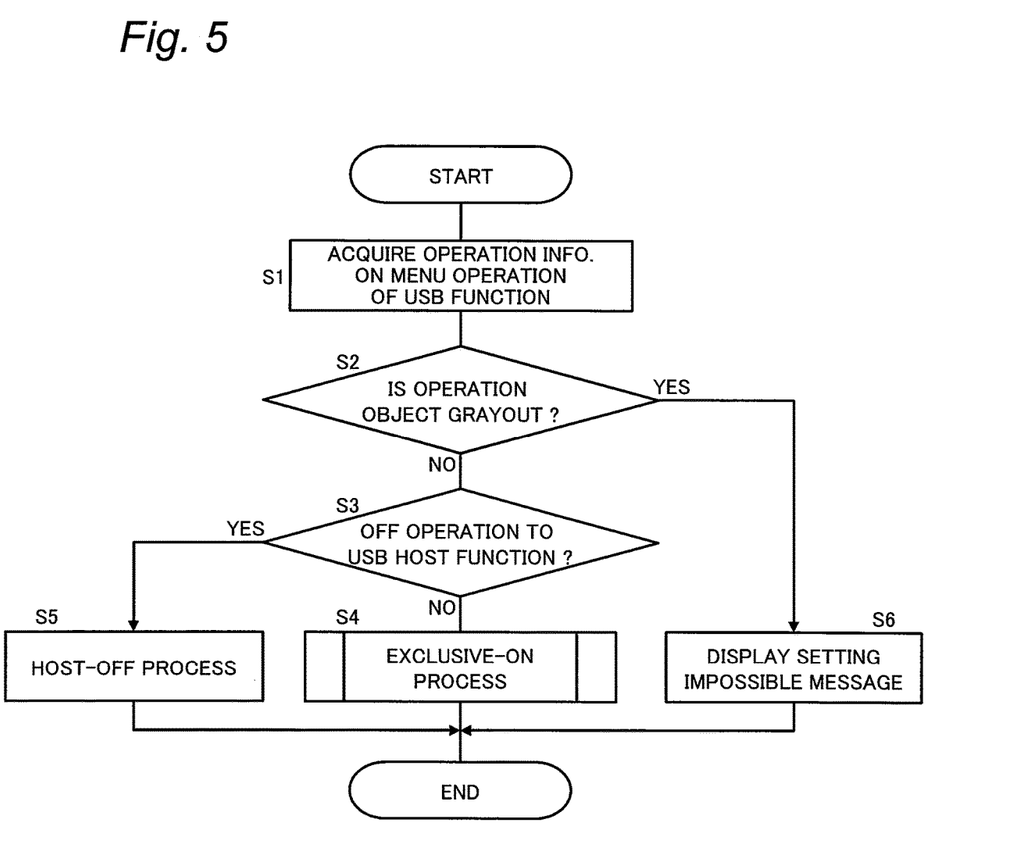
FIG. 5 is a flowchart showing an example of a menu setting operation of the digital camera.

An operation of performing menu setting for the USB functions F1 to F7 as described above in the digital camera 100 according to the present embodiment will be described with reference to FIGS. 4 to 6. FIG. 5 is a flowchart showing an example of a menu setting operation of the digital camera 100.

For example, a process shown in the flowchart of FIG. 5 is started when a user inputs a menu operation for changing settings of the USB functions F1 to F7 to the user interface 150. For example, the process of this flow is executed by the controller 135 in a state where management information for managing the rank among the USB functions F1 to F7 as shown in FIG. 4 is stored in advance in the flash memory 145 or the like of the digital camera 100.

First, the controller 135 of the digital camera 100 acquires operation information indicating the content of the input menu operation from the user interface 150 (S1). For example, the menu operation is an operation of the decision button 153 or the like for the menu items M1 to M21 (FIGS. 3A to 3D) regarding the USB functions F1 to F7. The acquired operation information indicates an operation object in the menu items M1 to M21 or the corresponding USB functions F1 to F7, for example.

Next, the controller 135 determines whether the operation object is in a grayout state, based on the acquired operation information (S2). For example, the determination in step S2 is performed by using the management information corresponding to FIG. 4 or information of a current state of a setting menu. For example, when a menu operation for changing a setting of a USB function higher than a USB function currently in an on state is performed, the controller 135 proceeds to NO in step S2.

When the operation object is not in the grayout state (NO in S2), the controller 135 determines whether the input menu operation is an operation to turn off the USB host function currently in the on state, for example (S3). For example, when an operation to turn on the USB host function higher than the USB function currently in the on state is input, the controller 135 proceeds to YES in step S3.

When the input user operation is not the off operation of the USB host function (NO in S3), the controller 135 performs a process to exclusively set the USB function of the operation object to be an on state (S4). The exclusive-on process (S4) controls an on/off state and operability of the other USB function exclusively, according to the priority order with respect to the USB function of the operation object. For example, the controller 135 shifts an operation state of the digital camera 100 from a row where a USB function is in the on state before the operation to another row where the USB function of the operation object is the on state among the rows in the example of FIG. 4 (S4). Details of the exclusive-on process (S4) will be described later.

On the other hand, when the input user operation is the off operation of the USB host function (YES in S3), the controller 135 performs a process to change the USB host function of the operation object from the on state to an off state (S5). For example, in the host-off process (S5), the controller 135 cancels a host mode in the digital camera 100 and shifts to a device mode. The device mode is an operation mode in which the digital camera 100 functions as a device in the USB standard.

Further, in step S5, the controller 135 cancels various grayout states which is based on the USB host function that have been in the on state before the user operation. For example, the controller 135 shifts the digital camera 100 to an operation state of a row corresponding to the on state of any of the USB device functions F5 to F7 among the rows in the example of FIG. 4 (S5).

When the operation object is in the grayout state (YES in S2), the controller 135 causes the display monitor 130 to display a predetermined setting impossible message without changing a setting of an on/off state of the USB function (S6). The setting impossible message indicates that the former USB function is in an on state as a factor that the setting of the input menu operation cannot be changed. FIG. 6 shows a display example of step S6.

Figure 6:
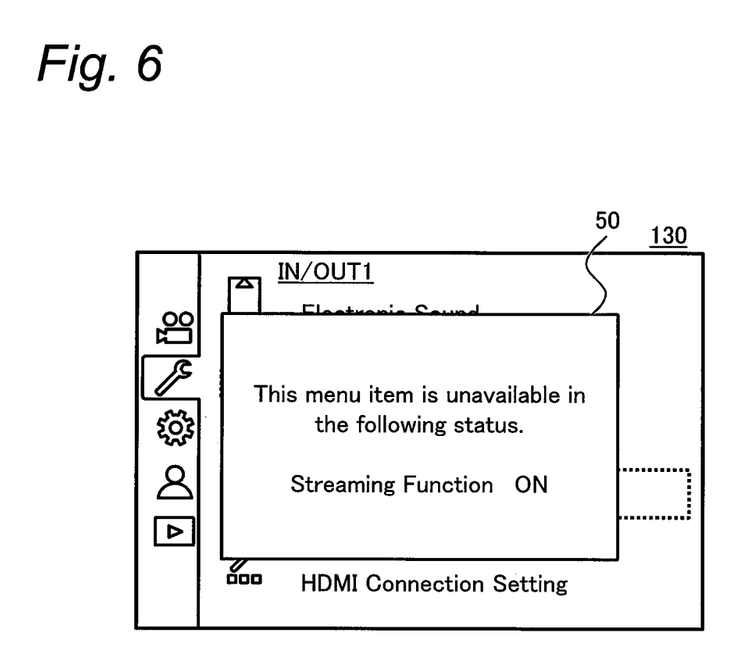
FIG. 6 is a diagram showing a display example of the menu setting operation of the digital camera.

FIG. 6 shows a case where the first or second streaming function F2 or F3 is in the on state (the former), and the menu item M2 of "USB" in FIG. 3A is operated as a menu operation for setting any of the USB functions F4 to F7 lower than the function F2 or F3 as the operation object (the latter). In step S6, the controller 135 generates a setting impossible message 50, based on the USB function currently in the on state and the operation object, and controls the display monitor 130 as shown in FIG. 6, for example. According to such a setting impossible message 50, the user can grasp that the factor that the setting of the menu item M2 cannot be changed is the USB host function F2 or F3 currently in the on state.

For example, the controller 135 ends the process shown in this flow after executing any of the processes of steps S4 to S6.

According to the above process, the digital camera 100 in the present embodiment receives the menu operation of the setting change for the USB function higher than the USB function in the on state before the menu operation of the user (NO in S2, S3), and changes the operated USB function to the on state (S4). At this time, the digital camera 100 basically changes the former USB function from the on state to the off state automatically (S4).

On the other hand, when the user performs the menu operation of the setting change for the USB function lower than the USB function in the on state before the operation (YES in S2), the digital camera 100 does not allow and prohibits the setting change, and displays the setting impossible message 50 (S6). For example, the user can easily use the lower USB function by turning off the higher USB function, owing to the setting impossible message 50.

Furthermore, when the user performs the off operation on the USB host function in the on state (YES in S3), the digital camera 100 changes the function to the off state, to automatically cancel the host mode (S5). As a result, an accident in which the host mode continues unintentionally can be suppressed, and the digital camera 100 can be utilized effectively.

2-1-1. Exclusive-on Process

The exclusive-on process in step S4 in FIG. 5 will be described with reference to FIGS. 7 to 9.

Figure 7:
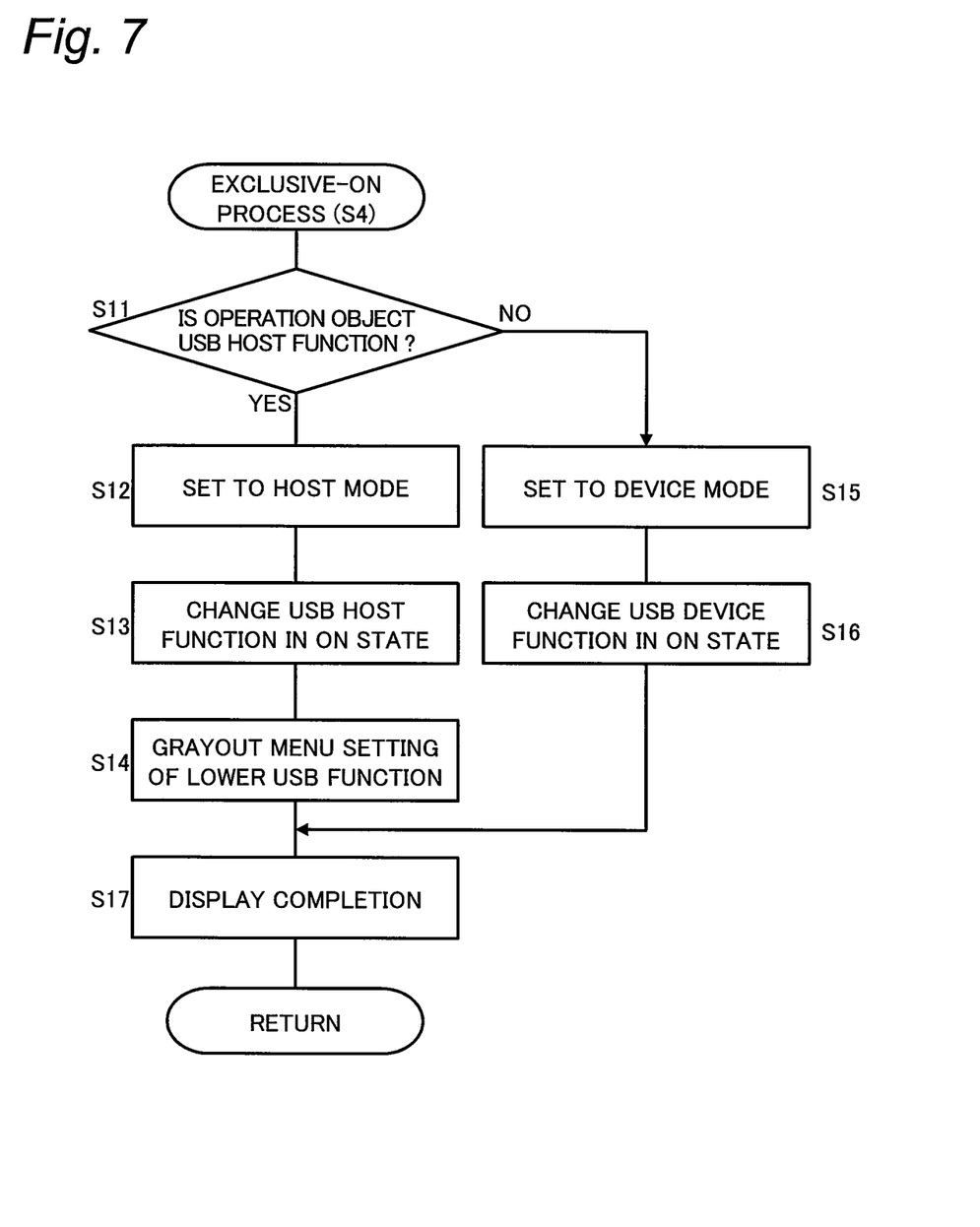
FIG. 7 is a flowchart showing an example of an exclusive-on process of the digital camera.

FIG. 7 is a flowchart showing an example of the exclusive-on process (S4) performed by the digital camera 100. FIG. 8 shows an example of grayout management information 60 of the USB functions F1 to F7 of the digital camera 100. FIG. 9 shows a display example of the exclusive-on process (S4).

First, the controller 135 determines whether or not the USB function of the operation object in the input menu operation is a USB host function, based on the operation information acquired in step S1 of FIG. 5, for example (S11).

When determining that the USB function of the operation object (the latter) is the USB host function (YES in S11), the controller 135 sets the digital camera 100 to a host mode (S12). Thus, when the USB function desired by a user is the USB host function, the digital camera 100 automatically shifts to the host mode according to the determination of the controller 135. When any of the USB device functions F5 to F7 is in the on state before the above operation (the former), this function is changed to an off state in step S12, for example.

Furthermore, the controller 135 changes a setting of the USB host function of the operation object to an on state in the digital camera 100 (S13). For example, when any of the USB host functions F1 to F4 is in the on state before the above operation (the former), the controller 135 changes the setting of the USB host function to an off state (S13). In step S13, when both of the former and the latter are USB host functions that can be used in combination, e.g. the former being the tether connection function F4 and the latter being the second streaming function F3, the controller 135 may maintain the former USB host function in the on state without turning it off.

Furthermore, the controller 135 controls a grayout state so as to prohibit a menu setting of the USB function lower than the USB host function of the operation object (S14). A process in step S14 will be described with reference to FIG. 8.

Figure 8:
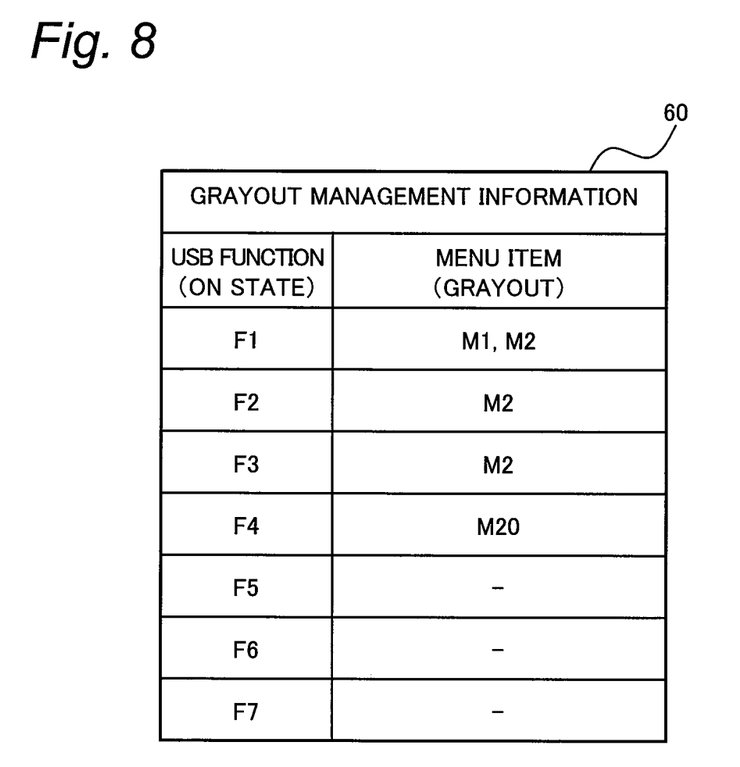
FIG. 8 is a diagram showing an example of grayout management information of the USB function of the digital camera.

FIG. 8 shows an example of the grayout management information 60 of the USB functions F1 to F7. The grayout management information 60 manages the USB functions F1 to F7 and a menu item displayed in grayout when each of the USB functions F1 to F7 is in an on state in association with each other. For example, referring to the grayout management information 60 stored in advance in the flash memory 145 or the like, the controller 135 control the menu item corresponding to the USB host function turned on in step S13 to be in the grayout state (S14). According to the grayout management information 60 of FIG. 8, grayout display of the function restriction in the priority order rank shown in FIG. 4 can be performed in the setting menus of FIGS. 3A to 3D.

On the other hand, when determining that the USB function of the operation object is not the USB host function (NO in S11), the controller 135 sets the digital camera 100 to a device mode instead of the host mode (S15).

The controller 135 changes settings of the USB device functions F5 to F7 so as to switch an on state from the USB device function in the on state before the operation to the USB device function of the operation object in the digital camera 100 (S16).

Next, the controller 135 controls the display monitor 130 to display a predetermined completion message, for example (S17). The completion message indicates that the setting change as in steps S12 to S16 is completed. FIG. 9 shows a display example of step S17.

Figure 9:
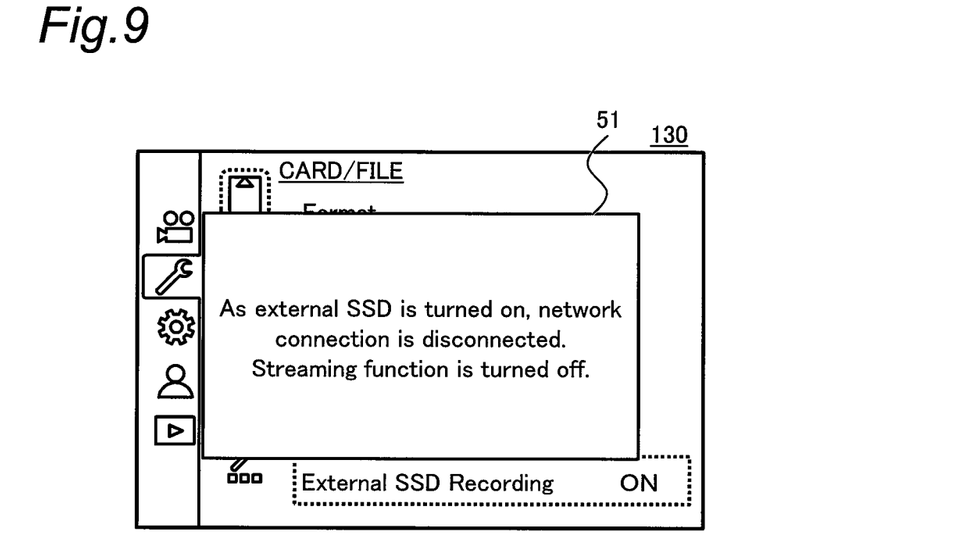
FIG. 9 is a diagram showing a display example of the exclusive-on process of the digital camera.

FIG. 9 shows a display example of a completion message 51 when, in the USB host functions F1 to F4, the former which is in the on state is the first streaming function F2 and the latter which is the operation object is the external recording function F1. In the present example, the digital camera 100 alerts the user that the former USB host function F2 has been turned off by the completion message 51. The completion display in step S17 is preset according to a combination of the USB functions in the on state before and after the operation, for example. The completion display in step S17 may be omitted depending on such a combination.

After the completion display (S17) as described above, the controller 135 ends the exclusive-on process, for example (S4 in FIG. 5).

According to the exclusive-on process (S4), when the USB function of the operation object is turned on, it is possible to exclusively perform the on/off control, and to prohibit the user operation for the lower USB function (S13, S14, S16).

When changing the USB function to the on state (S13), the controller 135 performs various settings for preparing to enable the USB function to be executed on the digital camera 100. For example, the controller 135 sets grayout display or the like for prohibiting a user operation for a function that cannot be used in addition to the USB functions F1 to F7. Such various settings of the on state are released in the off state.

In the above description, an example has been described in which the setting change completion display (S17) is performed when the USB function is turned on in the exclusive-on process. Alternatively or additionally, setting change confirmation display may be performed. Such a modification will be described with reference to FIG. 10.

Figure 10:
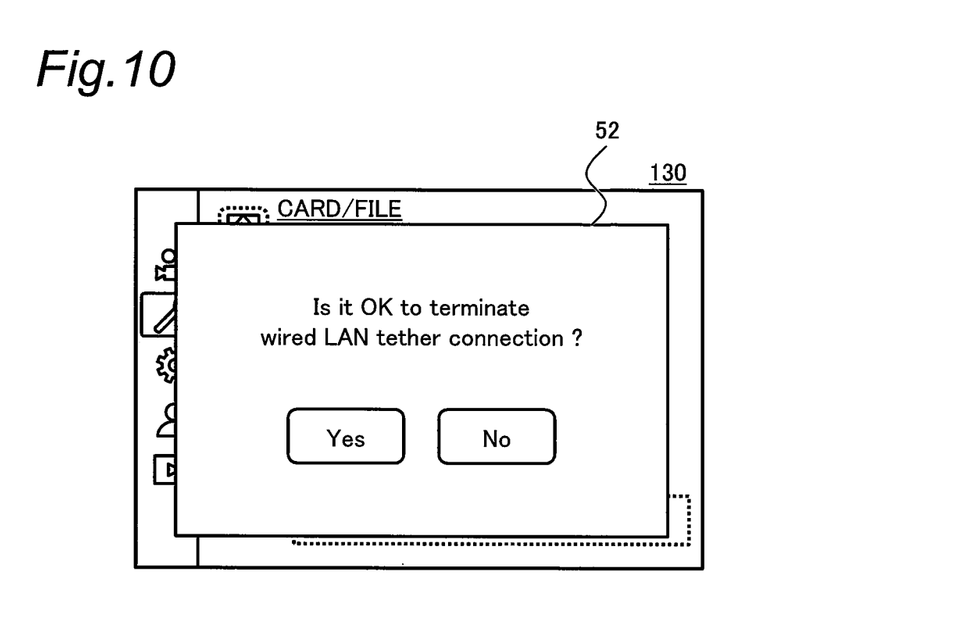
FIG. 10 is a diagram showing a modification of display of the exclusive-on process of the digital camera.

FIG. 10 shows a display example when the former in the on state is the tether connection function F4 and the latter is the higher USB host function F1 or F2. In this example, before step S11 or the like, the controller 135 causes the display monitor 130 to display a message 52 for confirming a user that a connection state of the tether connection function F4 is to be ended, and a yes/no option, as shown in FIG. 10.

At this time, when "Yes" is selected by a user operation, the controller 135 performs the processes of step S11 and the subsequent steps. On the other hand, when "No" is selected, the controller 135 does not perform the above processes to end the process of FIG. 5 without changing the setting, for example. As a result, even with the former USB function being lower than the operation object, the setting change can be canceled when the user wants to continue a use of the former, for example.

3. Conclusion

As described above, in the digital camera 100 of the present embodiment, a communication control device for communicating data with an external device is configured. The communication control device includes a USB connector 160 as an example of a communication interface, a controller 135, and a user interface 150. The USB connector 160 is connected with the external device according to a USB standard. The controller 135 controls a plurality of USB host functions F1 to F4 (examples of host functions) in which the communication control device performs each operation as a host for the external device in data communication via the USB connector 160. The user interface 150 sets an on/off state of each of the USB host functions F1 to F4 based on a user operation. The controller 135 controls the user interface 150 to restrict an allowed USB host function for changing setting by the user operation, according to a USB host function in an on state in the plurality of USB host functions F1 to F4 (S4).

According to the communication control device described above, in the plurality of USB host functions F1 to F4, the USB host function whose setting can be changed to the on state or the like by the user operation is restricted according to the host function currently in the on state. By performing such function restriction, it is possible to facilitate use of a function in which the communication control device serves as a host in data communication with the external device, such as various USB functions F1 to F7.

In the present embodiment, the plurality of USB host functions F1 to F4 has a higher or lower rank with each other (see FIG. 4). The controller 135 controls the user interface 150 to prohibit a setting change by the user operation for a lower USB host function than the USB host function in the on state (S14). Accordingly, when the higher USB host function is in the on state, the setting of the lower USB function cannot be intentionally changed, so that the digital camera 100 can be easily utilized.

In the present embodiment, when a user operation of turning on a higher USB host function than one USB host function of the plurality of USB host functions F1 to F4 is input to the user interface 150 with the one USB host function being in an on state (NO in S2, S3), the controller 135 changes the higher USB host function to an on state (S13), and controls the user interface 150 to prohibit a setting change by the user operation for the one USB host function (S14). Accordingly, even when the lower USB host function is in the on state, the higher USB host function is preferentially turned on according to the user operation, so that the user can easily use the digital camera 100.

In the present embodiment, when the user operation of turning on the higher USB host function is input to the user interface 150 with the one USB host function being in the on state (NO in S2, S3), the controller 135 further changes the one USB host function from the on state to an off state (S13, see FIG. 4). Accordingly, the USB function in the on state can be narrowed down to one, and the digital camera 100 that can be a host can be easily used.

The communication control device of the present embodiment further includes the display monitor 130 as an example of an annunciator. When a user operation of turning on a lower USB host function than one USB host function of the plurality of USB host functions F1 to F4 is input to the user interface 150 with the one USB host function being in an on state (NO in S2, S3), the annunciator notifies that the one USB host function is in the on state (S6, see FIG. 6). Accordingly, the user can see that a factor that a setting change is prohibited is the USB host function in the on state, and can easily use the digital camera 100.

In the present embodiment, the controller 135 further controls USB device functions F5 to F7 (examples of device functions) in which the communication control device does not operate as the host in data communication via the USB connector 160. The USB device functions F5 to F7 have a lower rank than the USB host functions F1 to F4. Accordingly, function restriction prioritizing the USB host functions F1 to F4 over the USB device functions F5 to F7 can be performed, and it is possible to easily use the function in which the communication control device serves as the host in data communication with the external device.

In the present embodiment, when there is a USB host function in an on state in the plurality of USB host functions F1 to F4 (YES in S11), the controller 135 operates the communication control device as the host (S12). When there is no USB host function in an on state in the plurality of USB host functions F1 to F4 (NO in S11), the controller 135 does not operate the communication control device as the host (S15). Accordingly, only when the USB host function is used for example, the digital camera 100 is operated as the host, so that the digital camera 100 having such a function can be easily used.

In the present embodiment, the controller 135 controls the user interface 150 to receive a user operation of turning off a USB host function for the USB host function in the on state (S3 to S4, see FIG. 4). Accordingly, the USB host function in the on state can be turned off, and the digital camera 100 can be easily used.

In the present embodiment, the predetermined communication standard is a USB standard. The digital camera 100 can be easily used in various functions in data communication of the USB standard.

In the present embodiment, the digital camera 100 as an example of an imaging apparatus includes the communication control device and an image sensor 115 as an example of an image sensor that captures a subject image to generate image data. The plurality of USB host functions F1 to F4 includes at least one of the function F1 of recording the image data from the digital camera 100 to the external device via the USB connector 160, the functions F2 and F3 of streaming the image data using the external device, or the function F4 of acquiring a control signal for controlling an operation of the digital camera 100 from the external device. According to the digital camera 100, it is possible to facilitated use of a function in which the digital camera 100 serves as a host in data communication with the external device.

Other Embodiments

The first embodiment has been described above by way of example of the technology disclosed in the present application. However, the technology of the present disclosure is not limited to these embodiments, but is applicable to embodiments including changes, replacements, additions, omissions, and the like as appropriate. In addition, other embodiments may be practiced by combining the respective constituent elements described in the first embodiment. Accordingly, other embodiments will be presented hereinafter by way of example.

In the first embodiment described above, an example of the plurality of USB functions F1 to F7 in the digital camera 100 has been described, but the USB function in the digital camera 100 is not particularly limited to the above. In the present embodiment, the USB host function of streaming distribution is not limited to the above-described functions F2 and F3, for example. For example, a combination of the above-described streaming method and connection method may constitute a function of a combination different from the above-described functions F2 and F3. Furthermore, the detailed screen in FIG. 3C may include a streaming function that is not the USB host function, and may include a streaming function by Wi-Fi connection, for example.

Furthermore, the USB device functions F5 to F7 in the digital camera 100 are also not particularly limited to the above example. For example, a USB device function of a USB video class may be further included. The digital camera 100 is not required to have the plurality of USB device functions F5 to F7, and may have only one or less USB device function. For example, even when the digital camera 100 does not have a USB device function, it is possible to resolve various loads of the digital camera 100 in an on state by enabling turning off of the host mode.

In the respective embodiments described above, the operation example of restricting the menu operation of the USB functions F1 to F7 has been described. In the digital camera 100 of the present embodiment, the restricted user operation is not particularly limited to the menu operation. For example, the same restriction as the restriction described in the above embodiment can be applied to a user operation of each of the function buttons 156 to 158 to which the function for changing the on/off setting of each of the USB functions F1 to F7 is allocated, the icon, or the like.

In the respective embodiments described above, the case where the number of USB connectors 160 in the digital camera 100 is one has been described. The digital camera 100 of the present embodiment is not particularly limited to the above, and may include a plurality of USB connectors 160, for example. In this case, the controller 135 of the digital camera 100 controls an on/off state of the USB function to be used and whether or not a setting can be changed by a user operation for each USB connector 160 in the same manner as in the above embodiment, for example.

In the respective embodiments described above, the USB connector 160 has been exemplified as an example of the communication interface. In the present embodiment, the communication interface of the digital camera 100 is not particularly limited to the USB standard, and may transmit and receive data in accordance with various communication standards. For example, instead of the USB connector 160, a connector conforming to a Lightning standard may be used. Even in such a case, function restriction similar to that in the respective embodiments described above can be performed on the plurality of host functions.

In the respective embodiments described above, the digital camera 100 including the optical system 110 and the lens driver 112 has been exemplified. The imaging apparatus of the present embodiment is not required to include the optical system 110 and the lens driver 112, and may be an interchangeable lens type camera, for example.

While the digital camera has been described as an example of the imaging apparatus in the respective embodiments described above, the present disclosure is not limited to this example. The imaging apparatus according to the present disclosure may be any electronic device having an imaging function (e.g., a video camera, a smartphone, a tablet terminal, or the like).

Furthermore, in the respective embodiments described above, an example in which the communication control device is applied to the imaging apparatus has been described. In the present embodiment, the communication control device is not necessarily limited to the imaging apparatus, and may be applied to other various electronic devices.

The embodiments have been described by way of example of the technology of the present disclosure. The accompanying drawings and detailed description have been presented for this purpose.

Accordingly, some of the constituent elements described in the accompanying drawings and the detailed description may include not only essential constituent elements for solving the problem, but also constituent elements which are not essential for solving the problem, in order to illustrate the above technology. Therefore, it should not be immediately recognized that these non-essential components are imperative based on the fact that the non-essential components are described in the accompanying drawings and detailed description.

Further, since the above-described embodiments are for illustrating the technology in the present disclosure, various changes, substitutions, additions, omissions, and the like can be made within the scope of the claims or the equivalents thereof.

The present disclosure is applicable to various electronic devices that perform data communication with an external device, and is particularly applicable to an imaging apparatus.

The invention claimed is:

1. An imaging apparatus comprising:
    an image sensor that captures a subject image to generate image data,
    a communication interface that connects with an external device according to a predetermined communication standard;
    a controller that controls a plurality of host functions in which the communication control device performs each operation as a host for the external device in data communication via the communication interface; and
    a user interface that sets an on/off state for each of the host functions, based on a user operation,
    wherein the plurality of host functions includes at least one function in a function group including a function to record the image data to the external device from the imaging apparatus via the communication interface, a function to stream the image data using the external device, and a function to acquire a control signal for controlling an operation of the imaging apparatus from the external device, and
    among the plurality of host functions, according to a host function in the on state, the controller controls the user interface to restrict a host function for changing setting thereof based on the user operation.

2. The imaging apparatus according to claim 1, wherein the plurality of host functions each has a higher or lower rank with each other, and
    the controller controls the user interface to prohibit a setting change based on the user operation for a lower host function than the host function in the on state.

3. The imaging apparatus according to claim 2, further comprising an annunciator that notifies, in response to an input user operation to the user interface for turning on a lower host function than one host function of the plurality of host functions with the one host function being in the on state, that the one host function is in the on state.

4. The imaging apparatus according to claim 1, wherein the plurality of host functions each has a higher or lower rank with each other, and
    in response to an input user operation to the user interface for turning on a higher host function than one host function of the plurality of host functions with the one host function being in the on state,
    the controller changes the higher host function to the on state, and controls the user interface to prohibit a setting change based on the user operation for the one host function.

5. The imaging apparatus according to claim 4, wherein, in response to an input user operation to the user interface for turning on the higher host function with the one host function being in the on state, the controller further changes the one host function from the on state to the off state.

6. The imaging apparatus according to claim 1, wherein the plurality of host functions each has a higher or lower rank with each other,
    the controller further controls a device function in which the communication control device does not serve as the host in the data communication via the communication interface, and
    the device function has a lower rank than the host functions.

7. The imaging apparatus according to claim 1, wherein the controller
    operates the communication control device as the host when the host function in the on state is present in the plurality of host functions, and
    does not operate the communication control device as the host when no host function in the on state is present in the plurality of host functions.

8. The imaging apparatus according to claim 1, wherein the predetermined communication standard is a USB standard.

9. The imaging apparatus according to claim 1, wherein the communication interface includes at least one connecter for data communication,
    the user interface sets the on/off state for each of the host functions with respect to the connecter for data communication, and
    among the plurality of host functions, according to the host function in the on state set to the connecter for data communication, the controller controls the user interface to restrict the host function for changing setting thereof based on the user operation with respect to the connecter for data communication.

* * * * *